Patented Oct. 5, 1948

2,450,586

UNITED STATES PATENT OFFICE 2,450,586

PROCESS FOR SACCHARIFYING PLANT MATERIALS

John W. Dunning and Elbert C. Lathrop, Peoria, Ill., assignors to the United States of America as represented by the Secretary of Agriculture No Drawing. Application October 31, 1944, Serial No. 561,248

7 Claims. (Cl. 127—37)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to an improved, low-cost process for the treatment of cellulosic materials to produce 5-carbon and 6-carbon sugars and lignin relatively free of cellulose.

The term "cellulosic material" as used herein includes all plant materials or processed plant materials containing an appreciable amount of cellulose which may or may not contain other associated constituents, such as pentosans, sugars, lignin, ash, and so forth. Agricultural residues, such as corncobs, sugarcane bagasse, cottonseed or oat hulls, cereal straws, corn or soybean stalks, flax shives, hemp hurds, and so forth, serve particularly well as cellulosic materials for the purpose of this invention. Woods may also be used.

This invention has for its object the production of higher over-all yields of 5-carbon and 6-carbon sugars from materials of the type mentioned.

Another object of the invention is the production of relatively pure 5-carbon and 6-carbon sugars in separate solutions so that each of these classes of sugars may be directed to uses which will return the greatest profit. Most of the methods of saccharifying cellulosic materials prior to this invention have produced but one solution of sugars, which contained both $C_5$ and $C_6$ sugars in various proportions, depending on raw materials and on operating conditions.

A further object of the invention is the production of the separate sugar solutions in concentrations of 10 percent, or higher, normally used in industrial fermentation processes.

Other objects of the invention will be apparent from the following description.

In general, the invention comprises separating the $C_5$ sugars from the cellulosic material, by extraction with dilute sulfuric acid for a length of time such that the pentosans are hydrolysed to the extent of about 95 percent and the cellulose is hydrolysed to soluble sugars to the extent of less than 2 percent and preferably less than 1.5 percent. The solids to liquid ratio and the rate of extraction is adjusted so that a solution of products based on 5-carbon sugar content, as xylose and/or arabinose, is not less than 10 percent. This solution will contain, in addition to the 5-carbon sugars, not more than 1 percent of 6-carbon sugars as dextrose, together with 1 to 2 percent of furfural, 2 to 4 percent acetic acid, together with a small amount of formic acid and such sugar acids as may result from uronic acids present in the raw material.

The residue, which is now almost entirely free of pentosans, is dewatered and dried in a current of air, preferably at a solids temperature not in excess of 80° C., within a short period of time, preferably not over 30 minutes. The dried solids are comminuted, such as by grinding, preferably to pass a 40-mesh screen. The dry, porous, powdery residue should contain not more than 2 percent and preferably less than 1.5 percent moisture. It is then intimately mixed with 0.15 to 0.55 part of sulfuric acid of about 80 to 87 percent concentration at a temperature of 40° C. or lower. The resulting mixture is a free-flowing powder. The addition of the acid does not change this characteristic of the residue. This mixture is then subjected to a continuously changing directional pressure of above substantially 100 pounds per square inch for a period of time just short of the formation of any appreciable amounts of dextrose. Under pressures of 100 to 250 pounds per square inch, this period of time would be about 1 to 5 minutes. For best results, this period should not be extended substantially beyond 10 minutes and the operating temperature should not exceed substantially 45° C. Suitable machines for applying the pressure are rubber mills, mullers, kollergangs, or discontinuous screw presses. The resulting material is a stiff, plastic mass which is then hydrolyzed to produce dextrose. This may be accomplished by making the mass into a slurry with water at a concentration of less than about 10 percent and preferably about 7 to 9 percent sulfuric acid and pumping it under a pressure of 5 to 45 pounds per square inch and preferably under pressure through a coil hydrolyser heated to 120° to 135° C. The duration of hydrolysis should not be in excess of about 40 minutes and preferably may vary between 5 and 20 minutes. The hydrolysis mixture is flashed to atmospheric pressure. If the starting material contained lignin, it may now be removed by filtration. The sugar remaining in the lignin filter cake may be washed out with fresh water and the washings used as dilution water for making the slurry entering the hydrolyser.

The resulting solution, after removal of the lignin, has a sugar concentration of 10 percent or more based on the $C_6$ carbon sugar dextrose and contains not more than 1 percent $C_5$ sugars as xylose. The cellulose is converted to dextrose in at least 90 percent of theory. By neutralizing the sulfuric acid therein with lime and then filtering, the solution is rendered fermentable in excellent efficiencies by yeast to alcohol or by use of suitable organisms to butanol and acetone, 2,3-butylene glycol, gluconic acid, citric acid, or other fermentation products.

The solution of $C_5$ sugars obtained in the first step may be used without neutralization to produce furfural by well-known methods. If the solution is to be used for other purposes, the furfural produced in the first step may be removed by passing the hot extract directly to a vacuum distilling column. After neutralizing with lime, the xylose solution may be used directly for purposes of industrial fermentation. If crystalline xylose is to be produced, the small amount of gums present, which interfere with crystallization, as well as the acetic and formic acids, may be removed by means of solvent extraction, or the first step of the process may be modified to the extent that these interfering gums may be removed by first extracting the raw material countercurrent with water, which operation is then followed by the dilute sulfuric acid hydrolysis described. This water extraction results in less than 2 percent over-all loss of total sugars obtainable in the process.

The concentrations of sulfuric acid as the hydrolyzing and saccharification agent are critical. Although it was once assumed that both inorganic and organic acids were equivalents as hydrolyzing and saccharifying agents, more recent developments clearly indicate not only the non-equivalency of inorganic and organic acids, but also of different inorganic acids. For example, hydrochloric and sulfuric acids are not equivalents either in concentrated or dilute solutions as hydrolyzing and saccharifying agents.

The following data concerns the operation of the first step of our process:

Corncobs crushed to pass a 4-mesh screen were hydrolyzed to carry out the first step of our invention under various conditions of sulfuric acid concentration, temperature, time, and solids to liquid ratio, and the hydrolysate and residue were separately analyzed. Both atmospheric and elevated pressures were used in a steam-heated autoclave. The results in five different instances are given in the following Table 1.

Table 1

|  | 1 | 2 | 3 | 4 | 5 |
|---|---|---|---|---|---|
| Acid concentration, percent | 4.4 | 4.4 | 4.9 | 1.9 | 0.98 |
| Temperature, °C | 100 | 100 | 100 | 121 | 121 |
| Time, minutes | 55 | 50 | 50 | 50 | 50 |
| Solids to liquid ratio | 6:100 | 6:100 | 2:100 | 30:100 | 6:100 |
| Yield of xylose, percent | 84.1 | 86.9 | 84.1 | 86.1 | 87.5 |
| Yield of furfural (as xylose), percent | 10.9 | 8.4 | 12.2 | 9.3 | 9.9 |
| Extracted pentosans (sum of "1" and "2"), percent | 95.0 | 95.3 | 96.3 | 95.4 | 97.4 |
| Yield of dextrose, percent | 3.2 | 1.4 | 9.1 | 0.78 | 1.5 |

In Table 2 is given the analysis of whole cobs before and after the extraction process (conditions of "2" above in Table 1). In both cases the percent components are based on the weight of the original cobs.

Table 2

| Component | Before | After |
|---|---|---|
|  | Per cent | Per cent |
| Pentosans | 28.10 | 1.78 |
| Cellulose | 36.50 | 36.10 |
| Lignin | 10.40 | 10.37 |
| Ash | 1.48 | |
| Alcohol-benzene solubles | 6.20 | |
| Unidentified | 17.32 | |

The same conditions applied to cottonseed and oat hulls gave the results shown in Table 3.

Table 3

|  | Cottonseed hulls | | Oat hulls | |
|---|---|---|---|---|
|  | 1 | 2 | 1 | 2 |
| Acid concentration, percent | 4.4 | 4.4 | 4.4 | 4.4 |
| Temperature, °C | 100 | 100 | 100 | 100 |
| Time, minutes | 50 | 50 | 50 | 50 |
| Solids to liquid ratio | 6:100 | 5:100 | 6:100 | 7:100 |
| 1. Yield of xylose, percent | 85.6 | 85.0 | 85.0 | 81.3 |
| 2. Yield of furfural (as xylose), per cent | 9.5 | 10.4 | 10.0 | 9.1 |
| Pentosans extracted (sum of "1" and "2"), per cent | 95.1 | 95.4 | 95.5 | 90.4 |
| Yield of destrose | 1.8 | 4.4 | 1.2 | 0.7 |

Utilizing a continuous rather than a batch process, the following results were obtained, using corncobs as the raw material.

Table 4

|  | 1 | 2 | 3 |
|---|---|---|---|
| Acid concentration, per cent | 8.8 | 7.3 | 5.8 |
| Temperature, °C | 98.0 | 98.0 | 98.0 |
| Time of extraction in minutes | 105.0 | 125.0 | 129.0 |
| 1. Xylose in hydrolysate, percent of theory | 83.8 | 80.0 | 86.8 |
| 2. Furfural as xylose in hydrolysate, per cent of theory | 8.8 | 9.1 | 7.9 |
| 3. Sum of "1" and "2" | 92.6 | 89.1 | 94.7 |
| 4. Dextrose in hydrolysate, per cent of theory | 11.6 | 4.2 | 0.0 |
| 5. Xylose in residue, per cent of theory | 3.4 | 5.6 | 5.6 |
| 6. Dextrose in residue, percent of theory | 85.1 | 88.0 | 94.5 |
| 7. Total xylose, "3" plus "5" | 96.0 | 94.7 | 100.3 |
| 8. Total dextrose, "4" plus "6" | 96.8 | 92.2 | 94.5 |
| 9. Concentration of reducing sugar in hydrolysate | 22.9 | 18.5 | 14.2 |

We have found that a sharp fractionation of $C_5$ sugars from $C_6$ sugar-yielding material can only be obtained under limited conditions, which is substantiated by the above data, and they show, moreover, the great importance of the solids to liquid ratio. Higher concentrations of sulfuric acid were required for countercurrent extraction than for batch extraction.

Our process differs from the prior art in that it employs a series of controlled mild treatments so that the cellulose molecule is gradually degraded to a more and more homogeneous material without the premature production of dextrose. The initial degradation treatment involves the use of dilute acid; this is followed by the use of stronger acid for a brief period under rigorously controlled conditions. The material treated in this way becomes more and more homogeneous as the process continues and at the same time dextrose formation is avoided until substantially all the material is in condition to be directly hydrolyzed to dextrose. This final step is accomplished with dilute acid in a few minutes without affecting reversion or decomposition.

The extraction of the pentosans in the initial step of our process is essential to prevent conversion products thereof from interfering with the subsequent steps. The treatment to free the material of pentosans also results in a mild degradation of the cellulose to chains of somewhat shorter length. The treatment, however, is of short duration at relatively low temperatures and prevents any marked degradation of the cellulose to dextrose. If the specified conditions are carried out, not more than 1.5 percent of the cellulose is converted to glucose. By shortening the length of the chains, the cellulose becomes more homogeneous and penetration of acid used in subsequent treatments is more readily and uniformly obtained. This conditioning treatment constitutes a physical and a mild chemical change to produce a more nearly uniform and homogeneous raw material. We have found that the drying of the acid-free conditioned material produces no measurable hydrolysis.

Experiments were conducted to determine if it would be possible to produce an even more homogeneous material without producing deep-seated degradation of the cellulose. The conditioned residue from step one was dewatered to a moisture content of 50 percent and one part was mixed with 0.53 part of 85 percent sulfuric acid. After standing at room temperature for three hours, the mixture was hydrolyzed in the above manner and a yield of only 3 percent dextrose was obtained. It was discovered, however, that if the dewatered, unwashed residue was dried in a current of air at 70° C. and the resulting dry powder was hydrolyzed, a yield of 9 percent glucose resulted. This indicated that a further mild chemical action had taken place which was accompanied by the formation of derivatives which produce 6 percent of glucose on hydrolysis.

A drying temperature of 80° C. and a time of 30 minutes will not increase the extent of glucose production at this stage over 9 percent, and causes no destruction of cellulose.

The drying step utilized in our process appears to bring about further chain shortening and conversion of crystalline to amorphous areas in these lower molecular weight cellulose molecules.

The residue, into which the acid is dried, when ground and mixed under good agitation with 0.53 part of 85 percent sulfuric acid will, without further treatment, hydrolyze to yield only 60.6 percent dextrose. There is no apparent physical change after the addition and mixing of the concentrated acid. The material both before and after mixing was a free-flowing powder, which did not readily ball up when pressed between the fingers, if tested immediately after mixing. The powder when placed on the tongue tasted distinctly acid, but did not burn momentarily, contrary to expectations. The drying of the acid into the residue appears to favor this condition, since a higher cumulative yield of dextrose is obtained than when dried residue from which the acid had been washed is used. In this treatment more than half of the cellulose is converted to degradation products that will yield dextrose on hydrolysis. The product is not noticeably soluable in water.

We have found, contrary to the prior art, that it is unnecessary to use large amounts of concentrated sulfuric acid. Based on the original raw material, the total use of not more than 0.35 part of 100 percent acid is preferred. Not only have we found it unnecessary to use large amounts of acid, but also that the use of a smaller amount of acid results in higher yields of dextrose.

The yield of dextrose may be somewhat increased by allowing the material in which the acid has been mixed to stand for a definite period of time. The increase in the yield of dextrose by this method would be up to about 75 percent in 24 hours. Upon longer standing, reversion begins and results in decreases of dextrose yields. However, in our process, the use of continuously changing directional pressure increases the yield far beyond that which could be obtained by mere standing.

A two-minute pressure treatment in lieu of standing not only furnishes a homogeneuos appearing mass, but also produces a distinct chemical reaction. This pressure and chemical action is produced by working the powder on a rubber mill or passing it through an oil expeller press. When the mixture is treated for about 2 minutes at 40° C. in an expeller press, followed by hydrolysis, the yield of dextrose was found to be 89.0 percent. This is an increase of 29 percent in dextrose yielding substances as compared with the results of simply mixing with the concentrated acid, and a distinct increase over the 24-hour aging reaction above. The product emerging from the expeller, instead of being an easily flowing powder, is a stiff plastic mass, which leaves a smear on objects, such as paper, with which it comes in contact.

It is very important that the pressure step be completed in a short time, as indicated above. If the pressure is continued over a prolonged period of time, reversion takes place and the yield of dextrose consequently decreases. In order to understand the necessity for this quicker treatment, it is to be understood that as soon as the acid is mixed with the powdered residue, it acts upon it. This action may be either favorable or unfavorable depending upon the conditions. Furthermore, this action may be favorable for one period of time and unfavorable for another. The objective is, of course, to gradually reduce the residue to a homogeneous mass without appreciably effecting saccharification until the material is in substantially proper condition for saccharification. Accordingly, in view of the necessity for a short pressure treatment, special machines must be employed for this purpose. For example, a hydraulic press would be unsuitable, and also a pug mill or other types of machinery designed to mix materials. The most suitable machines for the purpose at present known are milling machines, such as those used to mill rubber, and discontinuous screw presses, which are also well known, both of which have been successfully used.

The final treatment in the saccharification process is the hydrolysis of the stiff plastic mass to dextrose. As little free dextrose as possible should be present in this material. In most previous processes using concentrated acid, the dextrose is secured by diluting the acid and boiling for 30 minutes or longer. However, maximum yields cannot be obtained by the use of boiling temperatures. In our process, it is necessary to hydrolyze under superatmospheric pressure. Sufficient water must be added to the stiff plastic mass under vigorous stirring so that a slurry having a concentration of 7 to 9 percent sulfuric acid is obtained. This slurry is then heated under pressure at 125°–130° C. for a period of 5 to 20 minutes. It is necessary to use superatmospheric pressure for this purpose rather than simple boiling at atmospheric pressures. Raw materials of initial high cellulose content, such as bagasse, require, for maximum yields, a hydrolysis time toward the upper limit of the range. For raw materials of lower cellulose content, such as flax shives, correspondingly lower pressure periods should be used.

The hydrolyzed liquid is flashed to atmospheric pressure and the lignin is separated by filtration. A $C_6$-sugar solution of 10 percent concentration or more is obtained. When the acid in this solution was neutralized with lime, followed by filtration, the solution was fermented readily to alcohol by yeast in efficiencies of 89 to 90 percent. No toxic substances are present to inhibit the growth of yeast or other organisms. Not more than one percent of $C_5$-sugars is present in the solution. The process yields sugar solution of the concentration normally used in industrial fermentations.

Our simplified process for the saccharification of cellulose to dextrose consists of treatments so regulated as to produce gradually a more and more homogeneous series of degradations of cellulose, substantially short of dextrose formation. When this process is conducted in a continuous industrial operation, it furnishes dextrose in yields approximating the highest reported to be obtainable in the prior art using other and complicated methods applied under careful and tedious laboratory conditions.

The following table shows the cumulative production of dextrose obtainable in each step.

*Table 5*

| Treatment | Dextrose obtained on hydrolysis |
|---|---|
| | Percent |
| (1) Dilute acid-treated raw material 99— of original cellulose | |
| (2) Dry acid into residue | 9.0 |
| (3) Grinding | 9.0 |
| (4) Mixing with 85% sulfuric acid | 60.6 |
| (5) Pressure extrusion | 89.0 |
| (6) Hydrolysis, process step | 89.0 |

The following examples will further illustrate our invention:

*Example 1*

The residue from 100 pounds of bagasse from which the pentosans had been extracted was dewatered to a 50 percent moisture content by means of a hydraulic press and the dewatered material was dried in a hot-air oven at 75° C. to 1 percent moisture content. This dry material was ground through a hammer mill to pass a 40-mesh screen and one part was mixed with 0.28 part of 85 percent sulfuric acid. The mixture was passed through an expeller press at 35° C. for two minutes and the stiff mass obtained was made into a slurry with water to 8 percent sulfuric acid content. This slurry was hydrolyzed at 125° C. for 10 minutes. A yield of 88 percent dextrose was obtained. The concentration of sugar in the resultant solution was slightly more than 10 percent.

*Example 2*

Corncob residue from the pentosan extraction step was treated in exactly the same manner as described for bagasse in Example 1, excepting that the hydrolysis period was 7 minutes instead of 10 minutes. The yield of dextrose was 89.1 percent and the concentration of sugar in solution was slightly more than 10 percent.

*Example 3*

Oat hull residue was treated in the same manner as the material in Example 2. The yield of dextrose was 91.9 percent and the concentration of the sugar in solution was above 10 percent.

Table 6 gives the comparative final yields obtained in Examples 1, 2, and 3, as well as the percent cellulose converted to glucose-yielding materials in various stages of the treatment.

*Table 7*

| Treatment | Yield of dextrose on hydrolysis | | |
|---|---|---|---|
| | Bagasse | Corncobs | Oat hulls |
| Acid dried into residue | 9.5 | 9.0 | 10.2 |
| Mixed with 85% sulfuric acid | 59.8 | 60.6 | 63.2 |
| After passing through expeller press | 88.0 | 89.1 | 91.9 |

In general, the process of this invention is a series of interdependent and interrelated treatments which may be carried out either batchwise or in one continuous operation, and the very nature of the treatments permits a high degree of chemical control.

The advantages of our invention reside in the fact that it results in higher yields of $C_5$ and $C_6$ sugars (based on theory) than have hitherto been obtained; that solutions of these sugars are obtained in a purer condition than like solutions obtained by previous investigators; that these purer solutions of $C_5$ and $C_6$ sugars are obtained in much higher concentrations than were heretofore possible, leading to greater economies in the fermentation of such solutions or in other industrial processing; and that the total time of processing from raw material to the finished products, viz., $C_5$ and $C_6$ sugar solutions and lignin residue, is much shorter; not exceeding 3 hours, than that of other prior processes.

Having thus described our invention, we claim:

1. In a process for the saccharification of plant material, the steps which include the progressive degradation of its cellulosic content in a plurality of successive stages which comprise treating said material with 1 to 6 percent sulfuric acid at a temperature of from 100° to 121° C. whereby pentosans are converted to pentoses and furfural and the cellulose is mildly degraded, drying the residue containing entrained sulfuric acid free of pentoses to further degrade the cellulose molecules, mixing the dried residue with 0.15 to 0.55 part of about 80 to 87 percent sulfuric acid at a temperature below substantially 40° C. whereby a free-flowing powder is obtained which upon hydrolysis will yield about 60 percent dextrose, subjecting said powder to mechanical mastication so as to develop continuously-changing directional pressures above substantially 100 pounds per square inch for a period not in excess of 10 minutes and at a temperature not in excess of substantially 45° C. to convert it into a stiff plastic mass whereby the molecules are still further degraded, said mastication being arrested at a point just short of the formation of substantial amounts of dextrose.

2. A method of saccharifying cellulosic materials which comprises treating said materials with 1 to 6 percent sulfuric acid at a temperature of from 100° to 121° C. to convert substantially quantitatively pentosans therein to pentoses and furfural, washing the treated material free of soluble pentose and other sugars with additional dilute sulfuric acid, dewatering and drying the residue, then comminuting and mixing it with 0.15 to 0.55 part of about 80 to 87 percent sulfuric acid per part of cellulosic material at a temperature below substantially 40° C., whereby a free-flowing powder is formed, subjecting the acid-mixed material at a temperature not in excess of about 45° C. for 1 to 5 minutes to mechanical mastication so as to develop continuously-changing directional pressures on the solids in excess of 100 pounds per square inch and just short of the formation of any substantial quantity of dextrose, whereby a pronounced physical and chemical change is effected to convert the powder to a stiff plastic mass, diluting the resultant mixture and hydrolyzing it to produce dextrose.

3. A method of saccharifying cellulosic materials which comprises treating said materials with 1 to 6 percent sulfuric acid at a temperature of from 100° to 121° C. to convert about 95 percent of the pentosans therein to pentoses and furfural and not substantially above 2 percent of the cellulose to dextrose, washing the treated material free of soluble pentose and other sugars with additional dilute sulfuric acid, dewatering and drying the residue, then comminuting and mixing it with 0.15 to 0.55 part of about 80 to 87 percent sulfuric acid per part of cellulosic material at a temperature below substantially 40° C., whereby a free-flowing powder is formed, subjecting the acid-mixed material at a temperature not in excess of about 45° C. for 1 to 5 minutes to mechanical mastication so as to develop continuously-changing directional pressures on the solids in excess of 100 pounds per square inch and just short of the formation of any substantial quantity of dextrose, whereby a pronounced physical and chemical change is effected to convert the powder to a stiff plastic mass, diluting the resultant mixture and hydrolyzing it to produce dextrose.

4. A method of saccharifying cellulosic materials which comprises treating said materials with 1 to 6 percent sulfuric acid at a temperature of from 100° to 121° C. to convert substantially quantitatively pentosans therein to pentoses and furfural, washing the treated material free of soluble pentose and other sugars with additional dilute sulfuric acid, dewatering and drying the residue to a moisture content of about 2 percent, grinding the dried material to small particles and mixing it with 0.15 to 0.55 part of about 80 to 87 percent sulfuric acid per part of cellulosic material at a temperature below substantially 40° C., whereby a free-flowing powder is formed, subjecting the acid-mixed material at a temperature not in excess of about 45° C. for 1 to 5 minutes to mechanical mastication so as to develop continuously-changing directional pressures on the solids in excess of 100 pounds per square inch and just short of the formation of any substantial quantity of dextrose, whereby a pronounced physical and chemical change is effected to convert the powder to a stiff plastic mass, diluting the resultant mixture and hydrolyzing it to produce dextrose.

5. A method of saccharifying cellulosic materials which comprises treating said materials with 1 to 6 percent sulfuric acid at a temperature of from 100° to 121° C. to convert substantially quantitatively pentosans therein to pentoses and furfural, washing the treated material free of soluble pentose and other sugars with additional dilute sulfuric acid, dewatering and drying the residue, then comminuting and mixing it with 0.15 to 0.55 part of about 80 to 87 percent sulfuric acid per part of cellulosic material at a temperature below substantially 40° C., whereby a free-flowing powder is formed, subjecting the acid-mixed material to mechanical mastication so as to develop continuously-changing directional pressures above substantially 100 pounds per square inch for a period not in excess of 10 minutes and at a temperature not in excess of substantially 45° C., diluting the resultant mixture and hydrolyzing it to produce dextrose.

6. A method of saccharifying cellulosic materials which comprises treating said materials with 1 to 6 percent sulfuric acid at a temperature of from 100° to 121° C., to convert substantially quantitatively pentosans therein to pentoses and furfural, washing the treated material free of soluble pentose and other sugars with additional dilute sulfuric acid, dewatering and drying the residue, then comminuting and mixing it with 0.15 to 0.55 part of about 80 to 87 percent sulfuric acid per part of cellulosic material at a temperature below substantially 40° C., whereby a free-flowing powder is formed, subjecting the acid-mixed material at a temperature not in excess of about 45° C. for 1 to 5 minutes to mechanical mastication so as to develop continuously-changing directional pressures on the solids in excess of 100 pounds per square inch and just short of the formation of any substantial quantity of dextrose, whereby a pronounced physical and chemical change is effected to convert the powder to a stiff plastic mass, diluting the resulting mixture with water to an acid concentration not in excess of substantially 10 percent and heating the diluted mixture under a pressure of 5 to 45 pounds per square inch for a period not in excess of 40 minutes.

7. A method of saccharifying cellulosic materials which comprises treating said materials with 1 to 6 percent sulfuric acid at a temperature of from 100° to 121° C. to convert substantially quantitatively pentosans therein to pentoses and furfural, washing the treated material free of soluble pentose and other sugars with additional dilute sulfuric acid, dewatering and drying the residue, then comminuting and mixing it with 0.15 to 0.55 part of about 80 to 87 percent sulfuric acid per part of cellulosic material at a temperature below substantially 40° C., whereby a free-flowing powder is formed, the total amount of both dilute and concentrated acid used being not more than 0.35 part per part of the original cellulosic material used by weight, subjecting the acid-mixed material at a temperature not in excess of about 45° C. for 1 to 5 minutes to mechanical mastication so as to develop continuously-changing directional pressures on the solids in excess of 100 pounds per square inch and just short of the formation of any substantial quantity of dextrose, whereby a pronounced physical and chemical change is effected to convert the powder to a stiff plastic mass, diluting the resultant mixture and hydrolyzing it to produce dextrose.

JOHN W. DUNNING.
ELBERT C. LATHROP.

(References on following page)

REFERENCES CITED

The following references are of record in the file of this patent:

UNITED STATES PATENTS

| Number | Name | Date |
|---|---|---|
| 146,860 | Wohl | Apr. 21, 1921 |
| 1,851,822 | Farber | Mar. 29, 1932 |
| 1,896,753 | Ricard | Feb. 7, 1933 |
| 2,086,701 | Dreyfus | July 13, 1937 |
| 2,188,193 | Scholler | Jan. 23, 1940 |
| 2,323,022 | Ferrari | June 29, 1943 |
| 2,426,677 | Fulmer et al. | Sept. 2, 1947 |

FOREIGN PATENTS

| Number | Country | Date |
|---|---|---|
| 523,190 | Great Britain | July 8, 1940 |
| 545,135 | Great Britain | May 12, 1942 |
| 545,136 | Great Britain | May 12, 1942 |